(12) United States Patent
Wobak (10) Patent No.: US 12,119,892 B2
(45) Date of Patent: Oct. 15, 2024

(54) DETERMINING INITIAL TRANSMISSION PHASE OFFSET IN AN NFC DEVICE

(71) Applicant: NXP B.V., Eindhoven (NL)

(72) Inventor: Markus Wobak, Graz (AT)

(73) Assignee: NXP B.V., Eindhoven (NL)

( * ) Notice: Subject to any disclaimer, the term of this patent is extended or adjusted under 35 U.S.C. 154(b) by 126 days.

(21) Appl. No.: 17/752,371

(22) Filed: May 24, 2022

(65) Prior Publication Data

US 2022/0407565 A1 Dec. 22, 2022

(30) Foreign Application Priority Data

Jun. 21, 2021 (EP) ..................................... 21180552

(51) Int. Cl.
*H04B 5/73* (2024.01)
*H04B 1/06* (2006.01)
(Continued)

(52) U.S. Cl.
CPC ................. *H04B 5/73* (2024.01); *H04B 1/06* (2013.01); *H04B 5/70* (2024.01); *H04B 5/72* (2024.01);
(Continued)

(58) Field of Classification Search
CPC ...... G01R 33/00; H04B 5/0043; H04B 17/12; H04B 17/21; H04B 17/29; H04B 1/06; H04B 5/0025; H04B 5/0031
See application file for complete search history.

(56) References Cited

U.S. PATENT DOCUMENTS

| 6,714,089 | B2 | 3/2004 | Ammar et al. |
| 9,887,832 | B1 | 2/2018 | Hueber et al. |
| | | (Continued) | |

FOREIGN PATENT DOCUMENTS

| EP | 0380979 A2 | 8/1990 |
| EP | 3226419 A1 | 10/2017 |
| | (Continued) | |

OTHER PUBLICATIONS

"EMV Contactless Specifications for Payment Systems; Book D; EMV Contactless Communication Protocol Specification"; Version 2.6; Mar. 2016.
(Continued)

*Primary Examiner* — Jermele M Hollington
*Assistant Examiner* — Taqi R Nasir (57) ABSTRACT

There is described a method of determining an initial transmission phase offset in an NFC device configured to operate in NFC card mode only, wherein the NFC device comprises an NFC chip and a matching circuit. The method comprises: determining an initial RF matching resonance frequency of the NFC device utilizing an internal oscillator of the NFC chip; reading correction data from a non-volatile memory of the NFC chip, the correction data being indicative of a frequency offset of the internal oscillator relative to a nominal oscillator frequency; determining a corrected RF matching resonance frequency of the NFC device based on the initial RF matching resonance frequency and the correction data; and determining the initial transmission phase offset based on the corrected RF matching resonance frequency. Furthermore, a device and a method of manufacturing an NFC device are described.

19 Claims, 3 Drawing Sheets

(51) Int. Cl.
*H04B 5/70* (2024.01)
*H04B 5/72* (2024.01)
*H04B 17/12* (2015.01)
*H04B 17/21* (2015.01)
*H04B 17/29* (2015.01)

(52) U.S. Cl.
CPC ............. *H04B 17/12* (2015.01); *H04B 17/21* (2015.01); *H04B 17/29* (2015.01)

(56) References Cited

U.S. PATENT DOCUMENTS

| | | | |
|---|---|---|---|
| 9,935,689 | B2 | 4/2018 | Hueber et al. |
| 10,019,608 | B2 | 7/2018 | Neffe et al. |
| 10,237,000 | B1 | 3/2019 | Buchsbaum et al. |
| 10,659,009 | B2 | 5/2020 | Hueber et al. |
| 11,005,534 | B2 | 5/2021 | Nunziata et al. |
| 2014/0256270 | A1* | 9/2014 | Cho .................. H04B 5/48 455/77 |
| 2014/0327398 | A1 | 11/2014 | Sato |
| 2015/0303994 | A1 | 10/2015 | Dhayni |
| 2019/0074914 | A1* | 3/2019 | Hueber .................. H04B 5/72 |
| 2020/0091608 | A1 | 3/2020 | Alpman et al. |

FOREIGN PATENT DOCUMENTS

| | | | |
|---|---|---|---|
| JP | 2014-27513 A | 2/2014 | |
| JP | 2014027513 A * | 2/2014 | ............. G06K 19/07 |

OTHER PUBLICATIONS

ISO/IEC 14443-1 "Cards and Security Devices for Personal Identification—Contactless Proximity Objects—Part 1: Physical Characteristics"; Fourth Edition; Apr. 2018.
ISO/IEC 14443-2 "Cards and Security Devices for Personal Identification—Contactless Proximity Objects—Part 2: Radio Frequency Power and Signal Interface"; Fourth Edition; Jul. 2020.
ISO/IEC 14443-3 "Cards and Security Devices for Personal Identification—Contactless Proximity Objects—Part 3: Initialization and Anticollision"; Fourth Edition; Jul. 2018.
ISO/IEC 14443-4 "Cards and Security Devices for Personal Identification—Contactless Proximity Objects—Part 4: Transmission Protocol"; Fourth Edition; Jul. 2018.
NFC Forum; "Analog Technical Specification"; Version 2.2; Jul. 29, 2021.
NFC Forum; "Digital Protocol Technical Specification"; Version 2.3; Aug. 3, 2021.

* cited by examiner

DETERMINING INITIAL TRANSMISSION PHASE OFFSET IN AN NFC DEVICE

CROSS-REFERENCE TO RELATED APPLICATIONS

This application claims priority under 35 U.S.C. § 119 to European Patent Application No. 21180552.8, filed on Jun. 21, 2021, the contents of which are incorporated by reference herein.

TECHNICAL FIELD

The present disclosure relates to the field of Near Field Communication (NFC) technology. More specifically, the present disclosure relates to a method of determining an initial transmission phase offset in an NFC device. The present disclosure further relates to an NFC device and to a method of manufacturing an NFC device.

ART BACKGROUND

A basic NFC system consists of a reader and a card device. The reader is generating a 13.56 MHz RF carrier to power the card device. A card device may be a passive device like a NFC tag or NFC-enabled credit card, but can also be an active device like an NFC-enabled mobile phone or wearable device (fitness tracker, smartwatch, etc.).

State-of-the art active NFC devices use Active Load Modulation (ALM) methods to generate load modulation for card to reader communication purposes in card emulation mode. As defined in related RF standards (such as ISO/IEC 14443, EMVCo, NFC Forum), it is essential that the ALM card mode transmission signal is sent synchronized to the RF field emitted by the reader. This is essential for RF standard compliance, but also for interoperability of devices in the field. In addition to maintaining a stable transmission phase during a card device frame, it is also important to have a stable initial phase.

To assure the latter, one approach in the prior art is to use external test equipment during production and testing to compensate the effects of NFC RF matching spread caused by matching component tolerances. More specifically, this approach involves deriving the NFC device's RF matching frequency. The dispersion of detected RF resonance frequency to target RF resonance frequency can be mapped to a required initial phase offset for the measured device.

Another approach is a self-phase compensation method described in U.S. patent Ser. No. 10/237,000 B1, which is incorporated herein by reference in its entirety and describes how, in a production environment, an NFC device can sweep its RF transmission frequency, measure back resulting signal strength at receiver input, and derive the related resonance frequency to perform the before-mentioned mapping to define initial transmission phase offset. Although this method does not require the expensive and complicated use of external test equipment, it still requires a stable and very accurate input frequency for precise determination of the resonance frequency. NFC devices capable of operating in reader mode usually have such frequency source available, whereas devices only operating in card mode do not.

There may thus be a need for a simple and inexpensive way of determining an initial transmission phase offset in NFC devices that do not have a built-in high-precision frequency source, e.g., in NFC-enabled wearable devices.

SUMMARY

This need may be met by the subject matter according to the independent claims. Advantageous embodiments of the present disclosure are set forth in the dependent claims.

According to a first aspect, there is provided a method of determining an initial transmission phase offset in an NFC device configured to operate in NFC card mode only, wherein the NFC device comprises an NFC chip and a matching circuit. The method comprises: determining an initial RF matching resonance frequency of the NFC device utilizing an internal oscillator of the NFC chip; reading correction data from a non-volatile memory of the NFC chip, the correction data being indicative of a frequency offset of the internal oscillator relative to a nominal oscillator frequency; determining a corrected RF matching resonance frequency of the NFC device based on the initial RF matching resonance frequency and the correction data; and determining the initial transmission phase offset based on the corrected RF matching resonance frequency.

This aspect is based on the idea that the internal oscillator of the NFC chip (e.g., the NFC controller clock), which is not particularly precise and prone to variations caused by production variation and environmental conditions, is used as a frequency source for determining the (initial) RF matching resonance frequency, and that correction data stored in the non-volatile memory of the NFC chip is used to obtain a corrected (i.e., very precise) RF matching resonance frequency. Thereby, the NFC device is capable of performing a self-phase compensation method without having access to a high-precision frequency source, which is usually not available in devices configured to operate in card mode only. Instead, the internal oscillator of the NFC chip is used, and the resonance frequency is corrected by utilizing correction data indicative of a frequency offset of the internal oscillator relative to a nominal oscillator frequency. Furthermore, there is also no need for external test equipment.

According to an embodiment, the correction data comprises a first correction factor indicative of a frequency offset associated with a silicon process used to manufacture the NFC chip. Furthermore, determining the corrected RF matching frequency comprises applying the first correction factor to the initial RF matching frequency.

In other words, the first correction factor provides information on a frequency offset for the internal oscillator, which is related to the silicon process used when manufacturing the NFC chip. By applying the first correction factor to the determined initial RF matching frequency, a corresponding correction of the resonance frequency is obtained.

According to a further embodiment, the correction data comprises a second correction factor indicative of a frequency offset associated with an operating voltage of the NFC chip. Furthermore, determining the corrected RF matching frequency comprises applying the second correction factor to the initial RF matching frequency.

In other words, the second correction factor provides information on a frequency offset for the internal oscillator, which is related to the operating voltage of the NFC chip. By applying the second correction factor to the determined initial RF matching frequency, a corresponding correction of the resonance frequency is obtained.

According to a further embodiment, the correction data further comprises a reference operating voltage, and the method further comprises measuring an actual operating voltage of the NFC chip. Determining the corrected RF matching frequency is further based on a difference between the measured actual operating voltage of the NFC chip and the reference operating voltage.

In this embodiment, an actual operating voltage of the NFC chip is measured and the difference between the measured actual operating voltage and a reference operating voltage (comprised in the correction data) is used to correct the initial resonance frequency.

According to a further embodiment, the correction data comprises a third correction factor indicative of a frequency offset associated with an operating temperature of the NFC chip. Furthermore, determining the corrected RF matching frequency comprises applying the third correction factor to the initial RF matching frequency.

In other words, the third correction factor provides information on a frequency offset for the internal oscillator, which is related to the operating temperature of the NFC chip. By applying the third correction factor to the determined initial RF matching frequency, a corresponding correction of the resonance frequency is obtained.

According to a further embodiment, the correction data further comprises a reference operating temperature, and the method further comprises measuring an actual operating temperature of the NFC chip. Determining the corrected RF matching frequency is further based on a difference between the measured actual operating temperature of the NFC chip and the reference operating temperature.

In this embodiment, an actual operating temperature of the NFC chip is measured and the difference between the measured actual operating temperature and a reference operating temperature (comprised in the correction data) is used to correct the initial resonance frequency.

According to a further embodiment, the corrected RF matching frequency is determined by adding (i) the initial RF matching frequency multiplied with the first correction factor, (ii) the initial RF matching frequency multiplied with the second correction factor and multiplied with the difference between the actual operating voltage of the NFC chip and the reference operating voltage, and (iii) the initial RF matching frequency multiplied with the third correction factor and multiplied with the difference between the actual operating temperature of the NFC chip and the reference operating temperature.

In other words, the corrected RF matching frequency $f_{cor}$ may be calculated from the initial RF matching frequency $f_{ini}$ as follows:

$$f_{cor} = (\alpha_P + (\alpha_V - 1) \cdot (V_{meas} - V_{ref}) + (\alpha_T - 1) \cdot (T_{meas} - T_{ref})) \cdot f_{ini}$$

In the above formula, $\alpha_P$ is the first correction factor and refers to the relative deviation that can be contributed to silicon process, $\alpha_V$ is the second correction factor and refers to the relative deviation that can be contributed to operating voltage, $\alpha_T$ is the third correction factor and refers to the relative deviation that can be contributed to the operating temperature, $V_{meas}$ is the measured actual operating voltage, $V_{ref}$ is the reference operating voltage comprised in the correction data, $T_{meas}$ is the measured actual operating temperature, and $T_{ref}$ is the reference operating temperature comprised in the correction data.

In this way, a linear approximation is applied that takes the frequency uncertainty caused by silicon process, voltage deviation and temperature deviation into account. In other embodiments, the approximation may be extended to a higher order. Furthermore, in some embodiments more than one reference value and/or correction factor may be used for one or more of the relevant parameters (silicon process, operating voltage, and operating temperature).

According to a further embodiment, the method further comprises operating the NFC chip for a predetermined period of time in order to provide a stable operating temperature prior to determining the initial RF matching resonance frequency and measuring the actual operating temperature.

In other words, the impact of any temperature variation that may occur right after starting operation of the NFC chip, i.e., while heating up from an initial to a stable operating temperature, is minimized by operating the NFC chip for a predetermined period of time before performing the measurements.

According to a further embodiment, the correction data is determined and written into the non-volatile memory during a silicon production test procedure.

In other words, the (first and/or second and/or third) correction factors and the corresponding reference values are determined by performing accurate measurements of the oscillator frequency for given operating conditions during the silicon test procedure. The results are stored in the non-volatile memory of the NFC chip, preferably in such a way that the correction data cannot be changed/overwritten.

According to a second aspect, there is provided a device configured to operate in NFC card mode only. The device comprises a matching circuit; and an NFC chip coupled to the matching circuit. The NCF chip comprises an internal oscillator; a non-volatile memory storing correction data indicative of a frequency offset of the internal oscillator relative to a nominal oscillator frequency; and an NFC processing unit. The NFC processing unit is configured to determine an initial RF matching resonance frequency of the NFC device utilizing the internal oscillator; read correction data from the non-volatile memory; determine a corrected RF matching resonance frequency of the NFC device based on the initial RF matching resonance frequency and the correction data; and determine an initial transmission phase offset based on the corrected RF matching resonance frequency.

This aspect is essentially based on the same idea as the first aspect discussed above and essentially provides an NFC-enabled device capable of performing the method according to the first aspect. In other words, the NFC device is capable of, as part of the production testing procedure, determine its initial transmission phase offset without access to a high-precision frequency source or use of expensive external test equipment.

According to a further embodiment, the correction data comprises a first correction factor indicative of a frequency offset associated with a silicon process used to manufacture the NFC chip. The NFC processing unit is further configured to determine the corrected RF matching frequency by applying the first correction factor to the initial RF matching frequency.

In other words, the first correction factor provides information on a frequency offset for the internal oscillator, which is related to the silicon process used when manufacturing the NFC chip. By applying the first correction factor to the determined initial RF matching frequency, a corresponding correction of the resonance frequency is obtained.

According to a further embodiment, the correction data comprises at least one of a second correction factor indicative of a frequency offset associated with an operating voltage of the NFC chip, and a reference operating voltage. The device further comprises a voltage sensor configured to measure an actual operating voltage of the NFC chip, and the NFC processing unit is further configured to determine the corrected RF matching frequency based on at least one of the second correction factor, the reference operating voltage and the actual operating voltage measured by the voltage sensor.

The voltage sensor is preferably an internal voltage sensor in the NFC chip that provides a voltage measurement signal indicative of the current operating voltage. The second correction factor provides information on a frequency offset for the internal oscillator, which is related to the operating voltage of the NFC chip, and/or a reference operating voltage. By basing the determination of initial RF matching frequency on at least one of the second correction factor, the reference operating voltage and the actual operating voltage measured by the voltage sensor, a corresponding correction of the resonance frequency is obtained. In particular, the correction may involve a difference between the measured operating voltage and the reference operating voltage.

According to a further embodiment, the correction data comprises at least one of a third correction factor indicative of a frequency offset associated with an operating temperature of the NFC chip, and a reference operating temperature. The device further comprises a temperature sensor configured to measure an actual operating temperature of the NFC chip, and the NFC processing unit is further configured to determine the corrected RF matching frequency based on at least one of the third correction factor, the reference operating temperature and the actual operating temperature measured by the voltage sensor.

The temperature sensor is preferably an internal temperature sensor in the NFC chip that provides a measurement signal indicative of the current chip temperature. The third correction factor provides information on a frequency offset for the internal oscillator, which is related to the operating temperature of the NFC chip, and/or a reference operating temperature. By basing the determination of initial RF matching frequency on at least one of the third correction factor, the reference operating temperature and the actual operating temperature measured by the temperature sensor, a corresponding correction of the resonance frequency is obtained. In particular, the correction may involve a difference between the measured operating temperature and the reference operating temperature.

According to a further embodiment, the NFC processing unit is configured to determine the corrected RF matching frequency by adding
(i) the initial RF matching frequency multiplied with the first correction factor,
(ii) the initial RF matching frequency multiplied with the second correction factor and multiplied with the difference between the actual operating voltage of the NFC chip and the reference operating voltage, and
(iii) the initial RF matching frequency multiplied with the third correction factor and multiplied with the difference between the actual operating temperature of the NFC chip and the reference operating temperature.

In other words, the corrected RF matching frequency $f_{cor}$ may be calculated from the initial RF matching frequency $f_{ini}$ as follows:

$$f_{cor} = (\alpha_P + (\alpha_V - 1) \cdot (V_{meas} - V_{ref}) + (\alpha_T - 1) \cdot (T_{meas} - T_{ref})) \cdot f_{ini}$$

In the above formula, $\alpha_P$ is the first correction factor and refers to the relative deviation that can be contributed to silicon process, $\alpha_V$ is the second correction factor and refers to the relative deviation that can be contributed to operating voltage, $\alpha_T$ is the third correction factor and refers to the relative deviation that can be contributed to the operating temperature, $V_{meas}$ is the measured actual operating voltage, $V_{ref}$ is the reference operating voltage comprised in the correction data, $T_{meas}$ is the measured actual operating temperature, and $T_{ref}$ is the reference operating temperature comprised in the correction data.

In this way, a linear approximation is applied that takes the frequency uncertainty caused by silicon process, voltage deviation and temperature deviation into account. In other embodiments, the approximation may be extended to a higher order. Furthermore, in some embodiments more than one reference value and/or correction factor may be used for one or more of the relevant parameters (silicon process, operating voltage, and operating temperature).

According to a further embodiment, the NFC processing unit is configured to operate the NFC chip for a predetermined period of time in order to provide a stable operating temperature prior to determining the initial RF matching resonance frequency and measuring the actual operating temperature.

In other words, the impact of any temperature variation that may occur right after starting operation of the NFC chip, i.e., while heating up from an initial to a stable operating temperature, is minimized by operating the NFC chip for a predetermined period of time before performing the measurements.

According to a further embodiment, the correction data is determined and written into the non-volatile memory during a silicon production test procedure.

In other words, the (first and/or second and/or third) correction factors and the corresponding reference values are determined by performing accurate measurements of the oscillator frequency for given operating conditions during the silicon test procedure. The results are stored in the non-volatile memory of the NFC chip, preferably in such a way that the correction data cannot be changed/overwritten.

According to a third aspect, there is provided a method of manufacturing an NFC device configured to operate in NFC card mode only. The method comprises manufacturing an NFC chip, the NFC chip comprising an internal oscillator, a non-volatile memory, and an NFC processing unit; determining, during a silicon production test procedure, correction data indicative of a frequency offset of the internal oscillator relative to a nominal oscillator frequency; writing the determined correction data into the non-volatile memory; mounting the NFC chip in the NFC device and connecting the NFC chip to a matching circuit; determining an initial RF matching resonance frequency of the NFC device utilizing the internal oscillator of the NFC chip; reading the correction data from the non-volatile memory of the NFC chip; determining a corrected RF matching resonance frequency of the NFC device based on the initial RF matching resonance frequency and the correction data; and determining the initial transmission phase offset based on the corrected RF matching resonance frequency.

The method according to this aspect builds on the ideas of the first and second aspects discussed above and provides an inexpensive and simple method of manufacturing an NFC device without a built-in high-precision frequency source and without the need for using expensive external test equipment during production in order to determine the initial transmission phase offset of the NFC device. The correction data is determined and written into non-volatile memory of the NFC chip during a silicon production test procedure. After assembling the actual NFC device (such as a wearable device with NFC card mode functionality), which among other things involves connecting the NFC chip to a matching circuit, a self-test is performed to determine the (initial) matching resonance frequency of the device. The initial matching resonance frequency is then corrected based on the correction data and the initial phase transmission phase offset is determined based on the corrected resonance frequency.

According to a further embodiment, the correction data includes at least one parameter selected from the group consisting of a first correction factor indicative of a frequency offset associated with a silicon process used to manufacture the NFC chip, a second correction factor indicative of a frequency offset associated with an operating voltage of the NFC chip, a reference operating voltage of the NFC chip, a third correction factor indicative of a frequency offset associated with an operating temperature of the NFC chip, and a reference operating temperature of the NFC chip.

The use and impact of these various correction factors and reference value has already been discussed above in conjunction with the first and second aspects.

According to a further embodiment, the method further comprises measuring at least one of an actual operating voltage of the NFC chip and an actual operating temperature of the NFC chip.

The use and impact of the actual operating voltage and/or actual operating temperature of the NFC chip has already been discussed above in conjunction with the first and second aspects.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

The illustration in the drawing is schematic. It is noted that in different figures, similar or identical elements are provided with the same reference signs or with reference signs, which differ only within the first digit.

Figure 1:
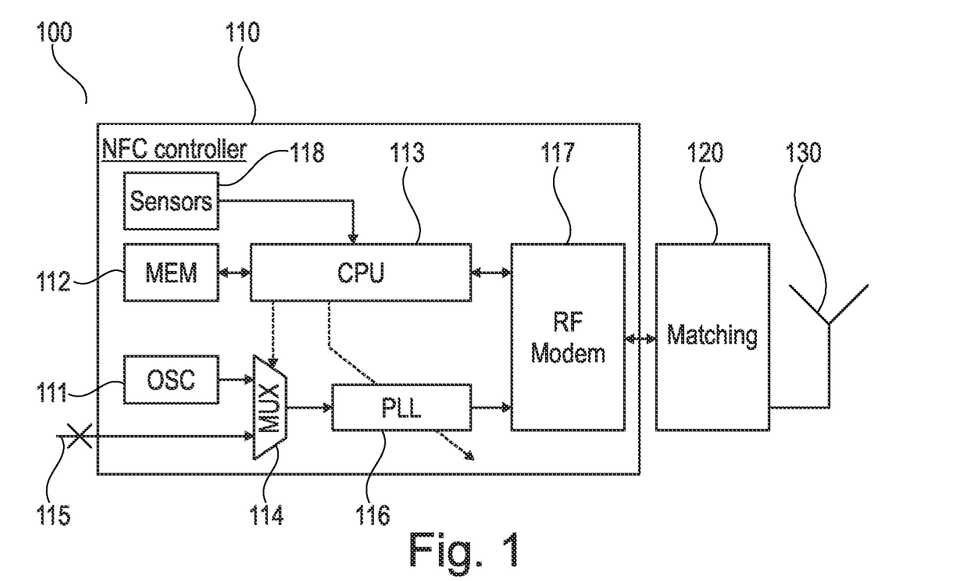
FIG. 1 shows a circuit diagram of an NFC device according to an exemplary embodiment of the present disclosure.

FIG. 1 shows a circuit diagram of an NFC device 100 according to an exemplary embodiment of the present disclosure. The device 100 comprises an NFC chip 110 (also referred to as NFC controller) coupled to a matching circuit 120 and an NFC antenna 130. The NFC chip 110 comprises an internal oscillator 111, a non-volatile memory 112, an NFC processing unit (CPU) 113, a multiplexer, a phase locked loop (PLL) 116, an RF modem 117, and one or more sensors 118. The internal oscillator 111 is coupled to provide an input frequency for the PLL 116 through multiplexer 116 during a self-phase compensation process as described in U.S. patent Ser. No. 10/237,000 B1. In this process, which is performed in a production environment, e.g., during testing of a product including the NFC device 100, a resonance frequency of the NFC device is determined by operating the RF modem 117 with a frequency sweep around the nominal operating frequency, e.g., 13.56 MHz. The initial transmission phase offset can then be determined from a mapping with the resonance frequency. For further details of this process, reference is made to aforementioned U.S. patent Ser. No. 10/237,000 B1, which is incorporated herein in its entirety by reference.

Different from prior art devices, the NFC chip 110 does not comprise or have access to a high-precision frequency source, such as a crystal present in devices capable of operating in reader mode. The lacking high-precision frequency source is illustrated by the cross on frequency input line 115. This is only for purposes of illustration—the line 115 will not be used in actual implementations of the NFC chip 110 as described herein. Due to the limited precision of the frequency provided by internal oscillator 111, the determined resonance frequency will deviate from the actual resonance frequency. Hence, an initial transmission phase offset determined on the basis of this resonance frequency would not be able to meet the requirements in terms of precision.

To overcome this problem, correction data stored in the non-volatile memory 112 is used to correct the resonance frequency before determination of the initial transmission phase offset. The correction data is generally indicative of a frequency offset of the internal oscillator relative to a nominal oscillator frequency, and may in particular involve one or more of the following: (i) a first correction factor indicative of a frequency offset associated with a silicon process used to manufacture the NFC chip; (ii) a second correction factor indicative of a frequency offset associated with an operating voltage of the NFC chip; (iii) a reference operating voltage; (iv) a third correction factor indicative of a frequency offset associated with an operating temperature of the NFC chip; and (v) a reference operating temperature. The correction data is obtained (by corresponding measurements) during a silicon production test procedure applied to the NFC chip 110 and stored into the non-volatile memory 112. In other words, the correction data is obtained prior to assembly of the device 100, in particular prior to connection with the matching circuit 120, power supply (not shown), etc.

In order to use the correction data to correct the determined (initial value of the) resonance frequency, the sensors 118 are configured to provide relevant information on actual operating voltage and actual operating temperature to the CPU 113.

Although the NFC device 100 is designed for use in systems that only need NFC card mode, it may of course also be implemented in systems where an NFC reader mode is provided by another (separate) NFC controller.

Figure 2:
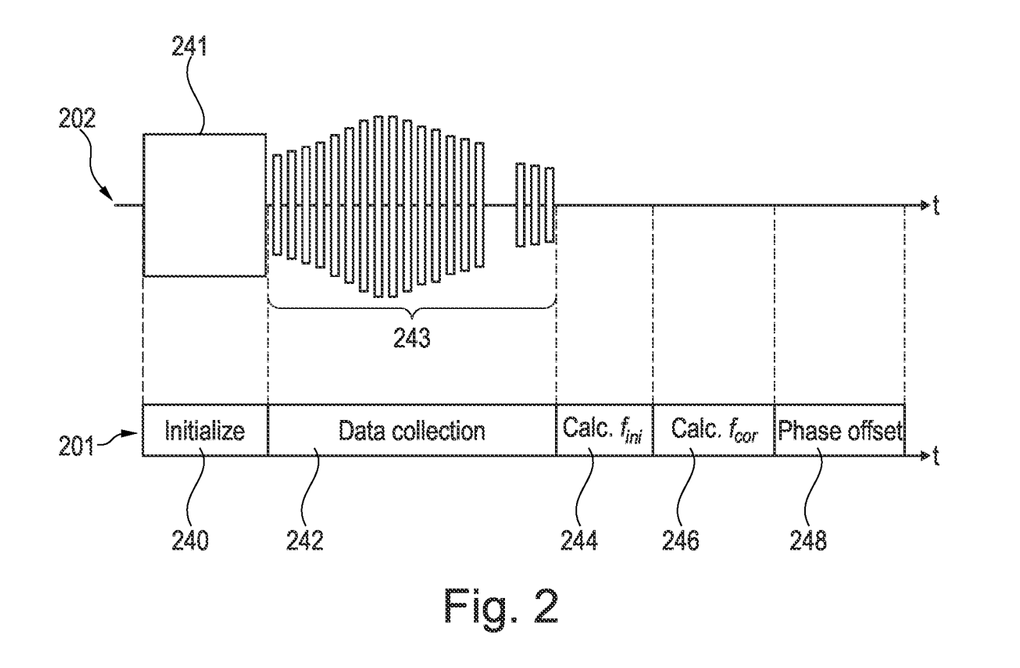
FIG. 2 illustrates a method of determining an initial transmission phase offset in an NFC device in accordance with an exemplary embodiment of the present disclosure.

FIG. 2 illustrates a method of determining an initial transmission phase offset in an NFC device, such as NFC device 100 shown in FIG. 1 and discussed above, in accordance with an exemplary embodiment of the present disclosure. The various steps of the method as performed over time t are shown in the lower part 201 of FIG. 2. The corresponding operation of the NFC chip 110, in particular the RF modem 117, is shown in the upper part 202 of FIG. 2.

The method begins at 240 with an initialization of the NFC device in order to prepare it for the actual measurements. The initialization 240 may involve turning on the NFC device 100 and, as an optional measure, operating the RF modem for a predetermined period of time in order to pre-heat the NFC chip 110 to a stable operating temperature. The latter is indicated at 241. If applicable, the actual operating temperature and/or actual operating voltage are also measured by sensors 118 as part of the initialization 240. Then, data collection 242 is performed by operating the PLL 116 to provide a frequency sweep 243 and measuring the resulting receiver signal as described in detail in U.S. patent Ser. No. 10/237,000 B1. At 244, the initial resonance frequency $f_{ini}$ is calculated or determined based on the collected data 242. Then, at 246, a corrected resonance frequency $f_{cor}$ is calculated or determined based on the correction data read from the non-volatile memory 112 and, if applicable, the measurement values from the sensors 118. As an example, a linear correction of the measured initial resonance frequency may be applied as follows:

$$f_{cor} = (\alpha_P + (\alpha_V - 1) \cdot (V_{meas} - V_{ref}) + (\alpha_T - 1) \cdot (T_{meas} - T_{ref})) \cdot f_{ini}$$

In the above formula, $\alpha_P$ is the first correction factor and refers to the relative deviation that can be contributed to silicon process, $\alpha_V$ is the second correction factor and refers to the relative deviation that can be contributed to operating voltage, $\alpha_T$ is the third correction factor and refers to the relative deviation that can be contributed to the operating temperature, $V_{meas}$ is the measured actual operating voltage, $V_{ref}$ is the reference operating voltage comprised in the correction data, $T_{meas}$ is the measured actual operating temperature, and $T_{ref}$ is the reference operating temperature comprised in the correction data.

Finally, at 248, the initial transmission phase offset of the NFC device 100 is determined on the basis of the corrected resonance frequency. The initial transmission phase offset is then stored in the configuration data of the NFC device 100 for future use as known in the art.

Figure 3:
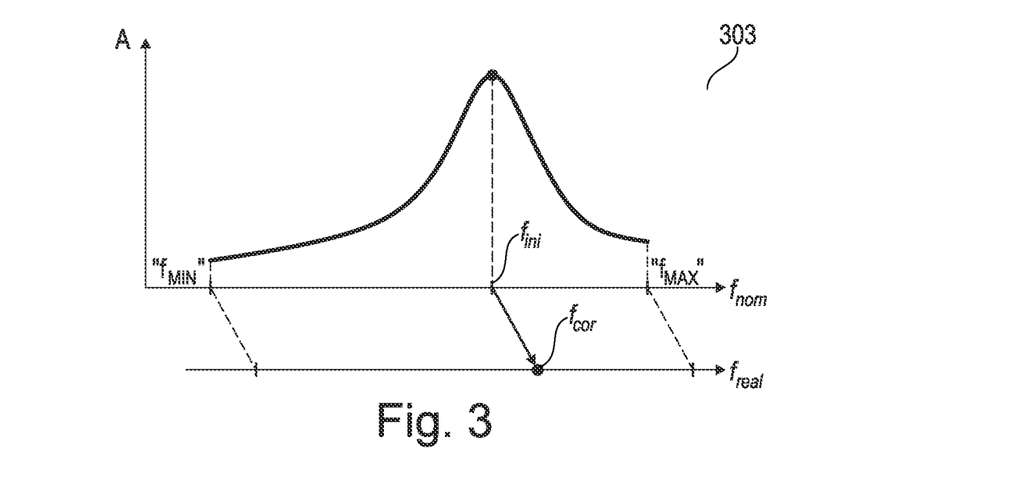
FIG. 3 shows a relation between initial and corrected resonance frequency in accordance with exemplary embodiments of the present disclosure.

FIG. 3 shows a relation 303 between initial and corrected resonance frequency in accordance with exemplary embodiments of the present disclosure. More specifically, FIG. 3 shows the measured signal amplitude A at various frequencies during the data collection 242 and frequency sweep 243 discussed above in conjunction with FIG. 2. As shown, the PLL 116 is controlled to provide a frequency sweep from a minimum nominal frequency value $f_{MIN}$ to a maximum nominal frequency value $f_{MAX}$ utilizing the internal oscillator 111 as reference frequency. Due to imprecision of the internal oscillator 111 frequency, the frequency sweep is displaced, as shown in the lower part of FIG. 3. The correction discussed above remedies this deviation by correction the measured initial resonance frequency $f_{ini}$ to $f_{cor}$.

Figure 4:
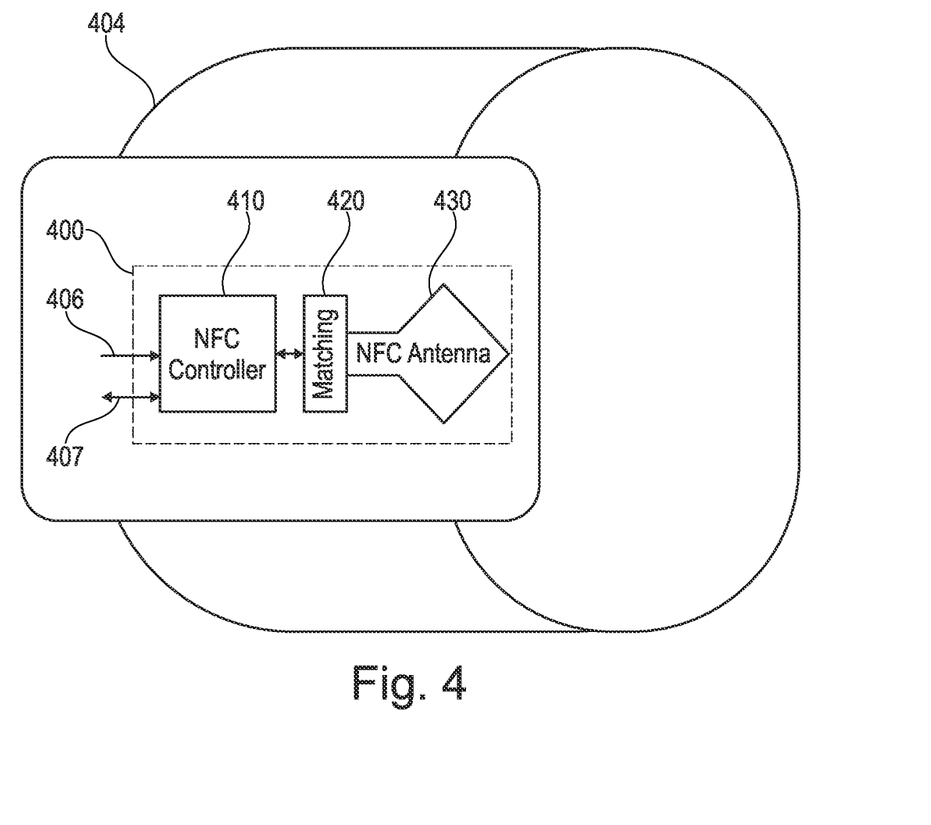
FIG. 4 shows a wearable device incorporating an NFC device according to an exemplary embodiment of the present disclosure.

FIG. 4 shows a wearable device in the form of a smart watch 404 incorporating an NFC device 400 according to an exemplary embodiment of the present disclosure, in particular NFC device 100 shown in FIG. 1. The NFC device 400 comprises NFC controller 410, matching circuit 420, and NFC antenna 430. Furthermore, the NFC device 400 comprises a power input 406 for receiving power from the wearable device 404, and a host interface 407 for exchanging data with the wearable device 404.

Figure 5:
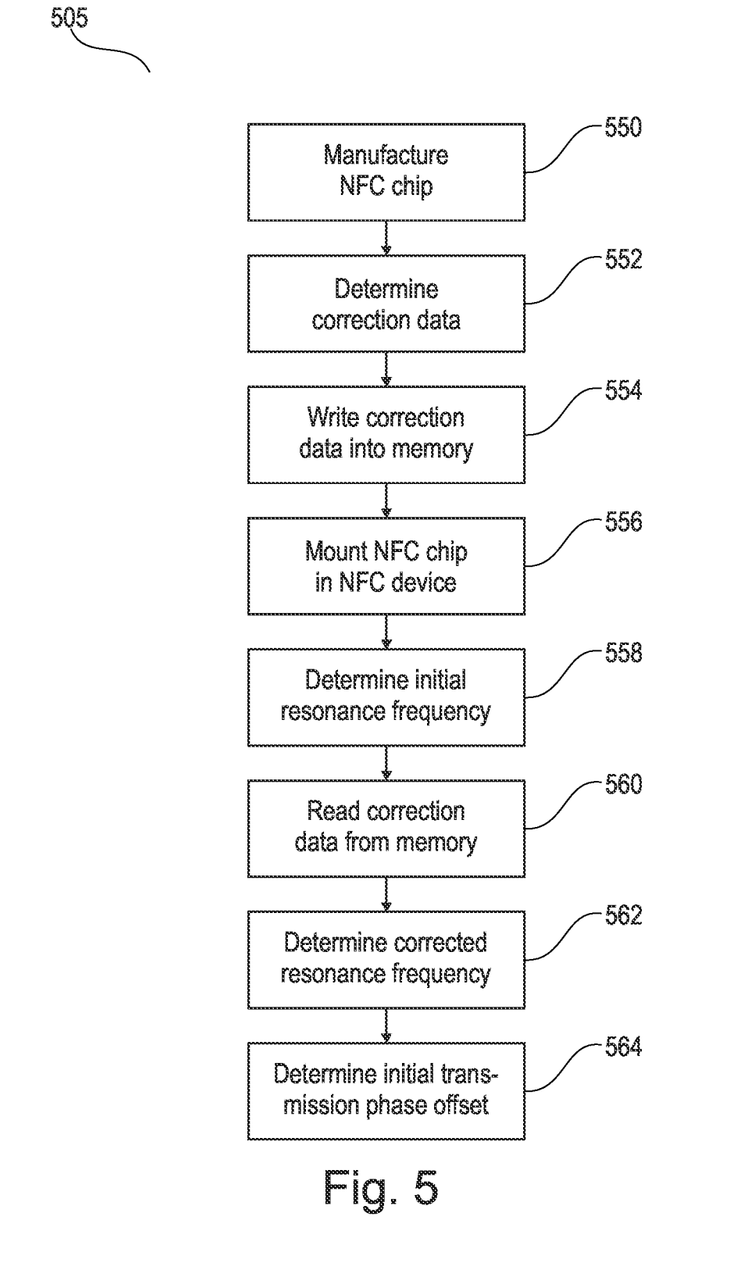
FIG. 5 shows a block diagram of a method of manufacturing an NFC device in accordance with an exemplary embodiment of the present disclosure.

FIG. 5 shows a block diagram of a method 505 of manufacturing an NFC device, such as NFC device 100 or 400, in accordance with an exemplary embodiment of the present disclosure. The method 505 begins at 550 with manufacturing an NFC chip 110. The NFC chip comprises an internal oscillator 111, a non-volatile memory 112, and an NFC processing unit 113. Then, at 552, the method continues by determining, during a silicon production test procedure, correction data indicative of a frequency offset of the internal oscillator relative to a nominal oscillator frequency. These correction data may correspond to the correction data discussed above. At 554, the method continues by writing the determined correction data into the non-volatile memory 112 of the NFC chip 110. The method further continues, at 556, by mounting the NFC chip 110 in the NFC device 100 and connecting the NFC chip 110 to a matching circuit 120. At 558, an initial RF matching resonance frequency $f_{ini}$ of the NFC device 100 is determined utilizing the internal oscillator 111 of the NFC chip 110. The method 505 then continues at 560 by reading the correction data from the non-volatile memory 112 of the NFC chip 110, and at 562 by determining a corrected RF matching resonance frequency $f_{cor}$ of the NFC device 100 based on the initial RF matching resonance frequency $f_{ini}$ and the correction data. Finally, at 564, the method is concluded by determining the initial transmission phase offset based on the corrected RF matching resonance frequency $f_{cor}$.

It should be noted that the frequency correction described above may also be used to perform other kinds of basic RF testing during production where a frequency close to 13.56 MHz is needed. For example, the internal oscillator (with frequency correction as described herein) may be used as an input to a PLL circuit in order to generate an RF frequency close to 13.56 MHz. Then, the RF modem is activated and internal sensors of the NFC IC perform measurements to detect if matching circuit and antenna are correctly connected. In this way, a simple detection of bad component assembly can be performed.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of determining an initial transmission phase offset in an NFC device configured to operate in NFC card mode only, wherein the NFC device comprises an NFC chip and a matching circuit, the method comprising
    determining an initial RF matching resonance frequency of the NFC device utilizing an internal oscillator of the NFC chip;
    reading correction data from a non-volatile memory of the NFC chip, the correction data being indicative of a frequency offset of the internal oscillator relative to a nominal oscillator frequency;

determining a corrected RF matching resonance frequency of the NFC device based on the initial RF matching resonance frequency and the correction data; and determining the initial transmission phase offset based on the corrected RF matching resonance frequency.

2. The method according to claim 1, wherein the correction data comprises a first correction factor indicative of a frequency offset associated with a silicon process used to manufacture the NFC chip, and wherein determining the corrected RF matching frequency comprises applying the first correction factor to the initial RF matching frequency.

3. The method according to claim 1, wherein the correction data comprises a second correction factor indicative of a frequency offset associated with an operating voltage of the NFC chip, and wherein determining the corrected RF matching frequency comprises applying the second correction factor to the initial RF matching frequency.

4. The method according to claim 3, wherein
the correction data further comprises a reference operating voltage,
the method further comprises measuring an actual operating voltage of the NFC chip, and
determining the corrected RF matching frequency is further based on a difference between the measured actual operating voltage of the NFC chip and the reference operating voltage.

5. The method according to claim 1, wherein the correction data comprises a third correction factor indicative of a frequency offset associated with an operating temperature of the NFC chip, and wherein determining the corrected RF matching frequency comprises applying the third correction factor to the initial RF matching frequency.

6. The method according to claim 5, wherein
the correction data further comprises a reference operating temperature,
the method further comprises measuring an actual operating temperature of the NFC chip, and
determining the corrected RF matching frequency is further based on a difference between the measured actual operating temperature of the NFC chip and the reference operating temperature.

7. The method according to claim 2,
wherein the correction data further comprises a second correction factor indicative of a frequency offset associated with an operating voltage of the NFC chip, and wherein determining the corrected RF matching frequency comprises applying the second correction factor to the initial RF matching frequency, wherein the correction data further comprises a reference operating voltage, the method further comprises measuring an actual operating voltage of the NFC chip, and determining the corrected RF matching frequency is further based on a difference between the measured actual operating voltage of the NFC chip and the reference operating voltage,
wherein the correction data further comprises a third correction factor indicative of a frequency offset associated with an operating temperature of the NFC chip, and wherein determining the corrected RF matching frequency comprises applying the third correction factor to the initial RF matching frequency, wherein the correction data further comprises a reference operating temperature, the method further comprises measuring an actual operating temperature of the NFC chip, and determining the corrected RF matching frequency is further based on a difference between the measured actual operating temperature of the NFC chip and the reference operating temperature, and
wherein the corrected RF matching frequency is determined by adding
(i) the initial RF matching frequency multiplied with the first correction factor,
(ii) the initial RF matching frequency multiplied with the second correction factor and multiplied with the difference between the actual operating voltage of the NFC chip and the reference operating voltage, and
(iii) the initial RF matching frequency multiplied with the third correction factor and multiplied with the difference between the actual operating temperature of the NFC chip and the reference operating temperature.

8. The method according to claim 5, further comprising operating the NFC chip for a predetermined period of time in order to provide a stable operating temperature prior to determining the initial RF matching resonance frequency and measuring the actual operating temperature.

9. The method according to claim 1, wherein the correction data is determined and written into the non-volatile memory during a silicon production test procedure.

10. A device configured to operate in NFC card mode only, the device comprising:
a matching circuit; and
an NFC chip coupled to the matching circuit, the NCF chip comprising:
an internal oscillator;
a non-volatile memory storing correction data indicative of a frequency offset of the internal oscillator relative to a nominal oscillator frequency; and
an NFC processing unit,
wherein the NFC processing unit is configured to:
determine an initial RF matching resonance frequency of the NFC device utilizing the internal oscillator;
read correction data from the non-volatile memory;
determine a corrected RF matching resonance frequency of the NFC device based on the initial RF matching resonance frequency and the correction data; and
determine an initial transmission phase offset based on the corrected RF matching resonance frequency.

11. The device according to claim 10, wherein the correction data comprises a first correction factor indicative of a frequency offset associated with a silicon process used to manufacture the NFC chip, and wherein the NFC processing unit is further configured to determine the corrected RF matching frequency by applying the first correction factor to the initial RF matching frequency.

12. The device according to claim 10, wherein the correction data comprises at least one of
a second correction factor indicative of a frequency offset associated with an operating voltage of the NFC chip, and
a reference operating voltage,
the device further comprising a voltage sensor configured to measure an actual operating voltage of the NFC chip, and
wherein the NFC processing unit is further configured to determine the corrected RF matching frequency based on at least one of the second correction factor, the reference operating voltage and the actual operating voltage measured by the voltage sensor.

13. The device according to claim 10,
wherein the correction data comprises at least one of a third correction factor indicative of a frequency offset associated with an operating temperature of the NFC chip, and a reference operating temperature, the device further comprising a temperature sensor configured to measure an actual operating temperature of the NFC chip, and wherein the NFC processing unit is further configured to determine the corrected RF matching frequency based on at least one of the third correction factor, the reference operating temperature and the actual operating temperature measured by the voltage sensor.

14. The device according to claim 11, wherein the NFC processing unit is configured to determine the corrected RF matching frequency by adding the initial RF matching frequency multiplied with the first correction factor, the initial RF matching frequency multiplied with the second correction factor and multiplied with the difference between the actual operating voltage of the NFC chip and the reference operating voltage, and the initial RF matching frequency multiplied with the third correction factor and multiplied with the difference between the actual operating temperature of the NFC chip and the reference operating temperature.

15. The device according to claim 13, wherein the NFC processing unit is configured to operate the NFC chip for a predetermined period of time in order to provide a stable operating temperature prior to determining the initial RF matching resonance frequency and measuring the actual operating temperature.

16. The device according to claim 10, wherein the correction data is determined and written into the non-volatile memory during a silicon production test procedure.

17. A method of manufacturing an NFC device configured to operate in NFC card mode only, the method comprising:

manufacturing an NFC chip, the NFC chip comprising an internal oscillator, a non-volatile memory, and an NFC processing unit;

determining, during a silicon production test procedure, correction data indicative of a frequency offset of the internal oscillator relative to a nominal oscillator frequency;

writing the determined correction data into the non-volatile memory;

mounting the NFC chip in the NFC device and connecting the NFC chip to a matching circuit;

determining an initial RF matching resonance frequency of the NFC device utilizing the internal oscillator of the NFC chip;

reading the correction data from the non-volatile memory of the NFC chip;

determining a corrected RF matching resonance frequency of the NFC device based on the initial RF matching resonance frequency and the correction data; and determining the initial transmission phase offset based on the corrected RF matching resonance frequency.

18. The method according to claim 17, wherein the correction data includes at least one parameter selected from the group comprising:

a first correction factor indicative of a frequency offset associated with a silicon process used to manufacture the NFC chip, a second correction factor indicative of a frequency offset associated with an operating voltage of the NFC chip, a reference operating voltage of the NFC chip, a third correction factor indicative of a frequency offset associated with an operating temperature of the NFC chip, and a reference operating temperature of the NFC chip.

19. The method according to claim 17, further comprising measuring at least one of an actual operating voltage of the NFC chip and an actual operating temperature of the NFC chip.

* * * * *